United States Patent [19]
Lunsford

[11] 3,858,036
[45] Dec. 31, 1974

[54] SQUARE ROOT OF SUM OF SQUARES APPROXIMATOR

[75] Inventor: John Albert Lunsford, Delran, N.J.

[73] Assignee: RCA Corporation, New York, N.Y.

[22] Filed: Feb. 26, 1974

[21] Appl. No.: 445,967

[52] U.S. Cl................................ 235/158, 235/193.5
[51] Int. Cl........................... G06f 7/48, G06g 7/20
[58] Field of Search .......... 235/158, 193.5; 328/144

[56] References Cited
UNITED STATES PATENTS
| | | | |
|---|---|---|---|
| 3,505,506 | 4/1970 | Kostalos, Jr. ................... | 235/158 X |
| 3,634,672 | 1/1972 | Weatherred, Jr. ............... | 235/193.5 |
| 3,702,927 | 11/1972 | Dvnou ................................ | 235/158 |

*Primary Examiner*—Malcolm A. Morrison
*Assistant Examiner*—David H. Malzahn
*Attorney, Agent, or Firm*—Edward J. Norton; Carl M. Wright

[57] ABSTRACT

Circuit for approximating the value of $\sqrt{(I^2 + Q^2)}$ using $\max(I + Q/2, Q + I/2)$.

4 Claims, 3 Drawing Figures

PATENTED DEC 31 1974 3,858,036

SQUARE ROOT OF SUM OF SQUARES APPROXIMATOR

The invention described herein was made in the course of or under a contract or a subcontract thereunder with the Department of the Air Force.

BACKGROUND OF THE INVENTION

Calculating the square root of the sums of two squares applies to such applications as rectangular to polar conversions and finding the resultant of two signal in quadrature. Squaring the input values, summing the products, and extracting the square root of the sum involve complicated and time-consuming procedures. Such procedures are uneconomical to implement in signal processing equipment when the accuracy of the result is limited by degradations of signals caused by noise, round-off, and the like.

The invention described and illustrated herein minimizes the above-mentioned drawbacks by employing a circuit for approximating $\sqrt{(I^2 + Q^2)}$ by the greater of $I + Q/2$ and $Q + I/2$, written usually as $\max(I + Q/2, Q + I/2)$.

BRIEF DESCRIPTION OF THE INVENTION

The signals indicating two values are compared to produce a signal depending on the relative magnitudes of the values. The signal representing the relative magnitudes controls a scaler which divides the lesser of the by values sby two and the greater, by one. The resulting quotients are summed in an adder.

DETAILED DESCRIPTION OF THE INVENTION

Figure 1:
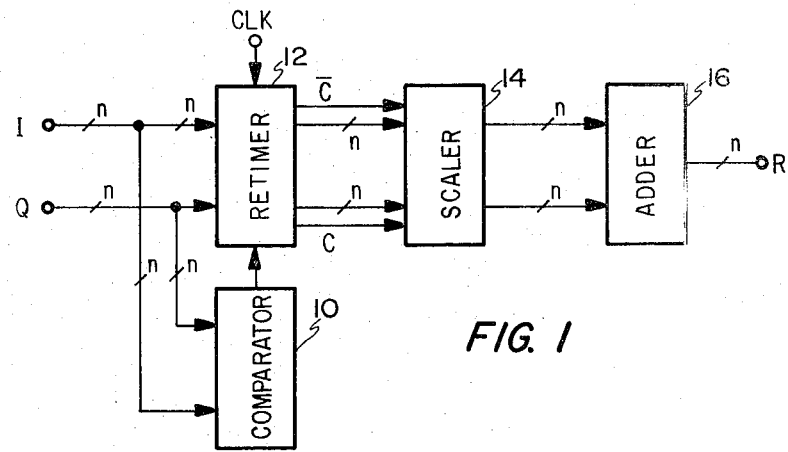
FIG. 1 is a block diagram of one embodiment of the invention.

The linear approximation, $\max(I + Q/2, Q + I/2)$, is used to approximate the value of $\sqrt{(I^2 + Q^2)}$. A typical application is a signal processing system, such as used in radar configurations, wherein in-phase ($I$) and quadrature ($Q$) signals are processed. The $I$ and $Q$ signals in a Fast Fourier Transform digital filtering network, for example, are processed separately and combined into a resultant. The values of $I$ and $Q$ are usually not exact because of noise, truncation, or other errors. It is desirable in a pipeline FFT network to approximate the value of resultant because the input values may not be exact, approximations can be calculated faster than exact results, and the circuits are less complex.

The magnitude of a resultant in a radar signal processor is typically compared to a threshold voltage to determine the presence of a target. The threshhold voltage is chosen to provide a high probability of target detection with a low probability of false alarms caused by spurious transients such as noise. The signal-to-noise ratio (S/N) of a target signal required to provide a given probability of detecting the target determines the maximum permissible S/N loss. Part of the S/N loss will be the error in the approximation of the resultant.

Letting $R$ represent the output signal from the approximator and $V$, an input variable, then $$R \doteq \sqrt{(I^2 + Q^2)}$$
$$\doteq I + Q/2$$
$$\doteq V(\cos \theta + 0.5 \sin \theta) \quad (1)$$

where $$I = V \cos \theta,$$
$$Q = V \sin \theta, \text{ and}$$
$$\theta = \arctan(Q/I).$$

Equation (1) assumes $I$ is greater than $Q$ and is symmetrical about $\theta = \pi/4$ because the value of I is larger than that of Q up to $\theta = \pi/4$, at which point I and Q are interchanged. Therefore, equation (1) is valid for values of $\theta$ from 0° to 45°. The mean of R is $$E(R) = (4/\pi) \int_0^{\pi/4} (\cos \theta + 0.5 \sin \theta)\, d\theta \quad (2)$$

and the mean of squares is $$E(R^2) = (4/\pi) \int_0^{\pi/4} (\cos \theta + 0.5 \sin \theta)^2\, d\theta \quad (3)$$

The variable V is dropped in equations (2) and (3) since $E(R)$ and $E(R^2)$ are divided by $V$ to reference the result to unity gain.

The standard deviation of R is $$\text{STD DEV} = \sqrt{(E(R^2) - E(R)^2)}. \quad (4)$$

The mean output value, $E(R)$, is found by equation (2) to be 1.08678, approximately. The STD DEV is found by equation (4) to be 0.03085, approximately.

The probability that $R$ is greater than a given threshold $T$ is $$\text{Prob}(R > T) = \iint_A p(\theta)\, p(V)\, d\theta dV \quad (5)$$

where $p(\theta)$ = uniform probability density function of $V$, and $A$ = area in the $V - \theta$ plane where $R > T$.

The probability density function of $V$ is $$p(V) = (V/\sigma^2_{in}) \exp(-V^2/2\, \sigma^2_{in}).$$

The noise is greater than $T$ when $$V \geq T/(\cos \theta + 0.5 \sin \theta)$$

so that equation (5) can be written $$\text{Prob}(R > T) = (4/\pi) \int_0^{\pi/4} \exp(-T^2/(2(\cos \theta + 0.5 \sin \theta)^2 \sigma^2_{in}))\, d\theta.$$

Integrating numerically, the following values are determined.

| Threshold (normalized) ($T/\sigma_{in}$) | False alarm Probability Probe($R > T$) |
|---|---|
| 4.0559 | $10^{-3}$ |
| 4.6900 | $10^{-4}$ |
| 5.2501 | $10^{-5}$ |
| 5.7577 | $10^{-6}$ |
| 6.2253 | $10^{-7}$ |
| 6.6612 | $10^{1168}$ |
| 7.0711 | $10^{-9}$ |
| 7.4592 | $10^{-10}$ |

The approximation has an RMS error referenced to a unity gain of 2.84 percent and a S/N loss for $P_d = 90\%$ and $P_{fa} = 10^{-6}$ of less than 0.1db, where $P_d$ = probability of detection of a target and $P_{fa}$ = probability of a false alarm, i.e., Prob($R > T$).

FIG. 1 is a block diagram of a preferred embodiment of the invention using digital techniques. The input signals to the circuit are $I$ and $Q$, each of which is a binary word. In one embodiment, each binary word comprises nine bits, i.e., eight bits magnitude and one bit sign, in bit parallel form. The signals $I$ and $Q$ are compared in a comparator 10 to determine which is larger, and the signals $I$ and $Q$ and the comparator output signal are stored in a register 12 in response to a clock signal.

The determination of the maximum of $I + Q/2$ and $Q + I/2$ can be made by comparing the values of $I$ and $Q$ as shown by the following relation. (The colon indicates a relationship of equal to, less than, or greater than.)

$$I + Q/2 : Q + I/2 \text{ (Relation)}$$
$$I : Q/2 + I/2 \text{ (Subtract } Q/2 \text{ from each side)}$$
$$I/2 : Q/2 \text{ (Subtract } I/2 \text{ from each side)}$$
$$I : Q \text{ (Multiply each side by 2)}$$

This means that if $I$ is greater than $Q$, then $I + Q/2$ is greater than $Q + I/2$; if $I$ is equal to $Q$, then $I + Q/2$ is equal to $Q + I/2$; and if $I$ is less than $Q$, then $I + Q/2$ is less than $Q + I/2$.

The comparator 10 can be a subtractor or modified adder which is well known in the art. For example, the comparator could be constructed of type SN5483 or SN7483 binary full adders (TI, Signetics, or National Semiconductor). The complement of either $I$ or $Q$ can be provided to an adder to effect a subtraction. The carry from the most significant position indicates the relationship of the values of $I$ and $Q$. Another type of commercially available unit from which the comparator 10 might be constructed is type SN54181 or SN74181 (same manufacturers). Such units can be coupled directly as comparators.

For purposes of explanation, the comparator 10 is coupled so as to subtract the value of $Q$ from the value of $I$. The output signal will be a logical one if the value of $Q$ is greater than the value of $I$ because it represents a borrow signal. If the values of $Q$ and $I$ are equal, or if the value of $Q$ is less than $I$, the output signal from the comparator will be a logical zero. The output signals from the register stage 12 storing the output signal from the comparator 10 will be such that the C signal will be a logical one and the $\overline{C}$ signal will be a logical zero if $Q$ is greater than the value of $I$. The C signal will be a logical zero and $\overline{C}$, a logical one, if the values of $I$ and $Q$ are equal or if the value of $Q$ is less than the value of $I$.

The output signals from the storage resistor 12, including the comparison result stage, are applied to a scaler 14. The scaler operates to shift the bits of the smaller of $I$ and $Q$ one digit position in the less significant direction, in effect a division by 2.

Figure 2:
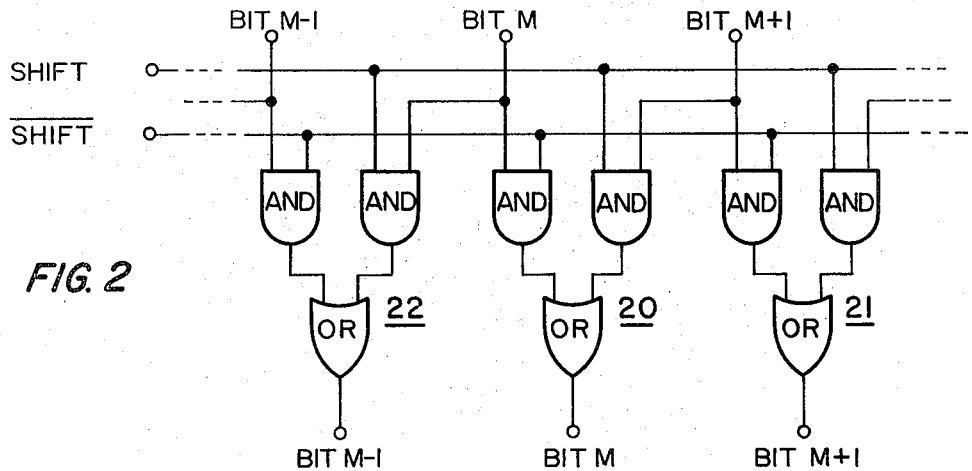
FIG. 2 is a logic diagram of stages in a typical scaler.

One type of scaler is shown in FIG. 2. Three typical AND-OR gate combinations 20–22 are shown with a bit of significance corresponding to the output bit applied as an input signal to a first AND gate of each combination. For example, the Mth significant bit is applied to an AND gate of the AND-OR combination 20. The other input to the same AND gate is the signal that indicates the bits are not to be scaled ($\overline{SHIFT}$). Similarly, the next more significant ($M + 1$)-th bit is applied to the AND-OR gate combination 21.

The second AND gate of each combination receives as an input signal a bit of a significance one position higher than that corresponding to the output. For example, bit M is applied as an input signal to an AND gate in the AND-OR combination 22 corresponding to the (M-1)-th output bit. The other input of the second AND gate is the signal indicating that the quantity is to be scaled (SHIFT). Similarly, the ($M + 1$)-th bit is coupled to the second AND gate in the AND-OR gate combination 20.

If the quantity is not to be scaled, the $\overline{SHIFT}$ signal is high (logical one) causing the M-th input bit to appear as the M-th output bit from the OR gate in the AND-OR combination 20, i.e., in its same position of significance. In a similar manner, the next more significant ($M + 1$)-th bit appears as the output signal of the OR gate of the AND-OR gate combination 21 in its same position of significance.

If the input bits are to be scaled, the SHIFT signal is a logical one causing each bit to appear as the output bit of the next less significant position. For example, the Mth bit appears as the OR gate output signal of the AND-OR gate combination 22 in the next less significant position, i.e., $M - 1$. Similarly, the next more significant bit ($M + 1$) appears as the OR gate output signal of the AND-OR gate combination 20 at its next less significant position, M. In the scaler 14, a separate AND-OR gate combination is provided for each of the $n$ input lines of the values of $I$ and $Q$, i.e., $2n$ gate combinations. For one of the values, $I$ or $Q$, the SHIFT signal will be the C signal from the storage register 12, and the SHIFT signal for the other value will be the $\overline{C}$ signal. The $\overline{SHIFT}$ signal in the first case will be the $\overline{C}$ signal and $\overline{SHIFT}$ for the other will be the C signal.

The output bits from the scaler 14 will be the values of $I$ and $Q$, the smaller of which will be divided by two. The output signals from the scaler are applied as input signals to an adder 16 which produces an output signal equal to the sum of $I + Q/2$ or $Q + I/2$ depending on the relative magnitudes of the values of $I$ and $Q$.

From the above description, it is clear that if an inverter is coupled to provide the complement of the output signal from the comparator 10 and if the signals from the output of the comparator 10 and the inverter are applied directly to the scaler 14 together with the signals $I$ and $Q$, the storage register 12 can be eliminated. The use of the storage register 12, however, provides a predetermined time period during which the input signals to the scaler 14, and thus to the adder 16, will not change. This allows the input values of $I$ and $Q$ to change in the period between clock pulses.

Figure 3:
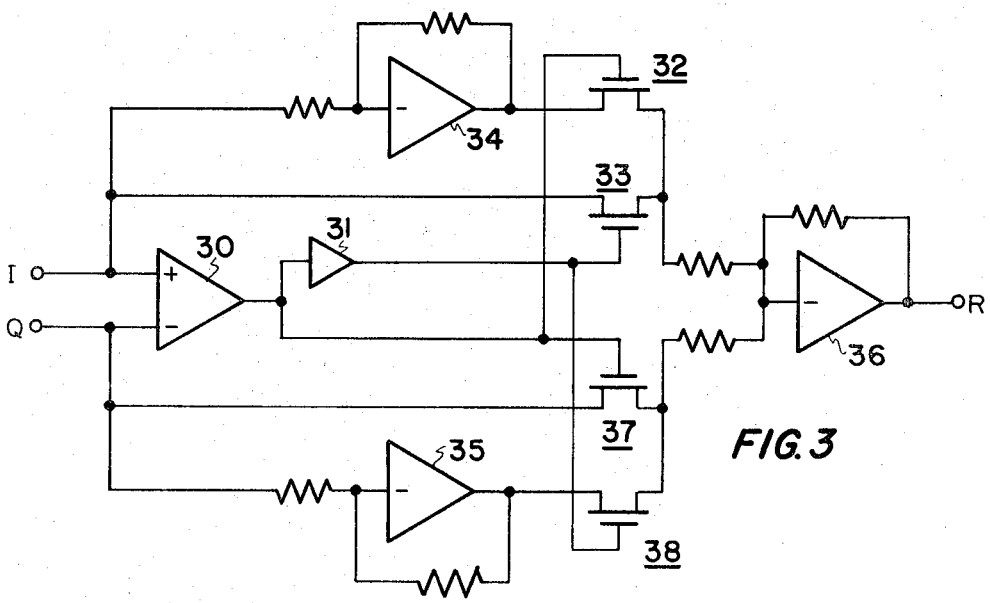
FIG. 3 is a schematic of an analog embodiment of the invention.

FIG. 3 is an illustration of an analog embodiment of the invention. The signals $I$ and $Q$ are analog signals representing the input values and are applied to a differential amplifier 30 which is coupled to operate as a comparator. The output signal of the comparator 30 is inverted by an inverter 31. The signal representing the value of $I$ is coupled to an amplifier 34 which has a feedback resistor value which is one-half the input resistor value so that the output of the amplifier 34 is one-half the value of the input value $I$. Similarly, signal $Q$ is coupled to an amplifier 35 in the same manner so that the output signal of the amplifier 35 is an analog signal whose value is half the value of $Q$. The output signal of the amplifier 34 is coupled to the input of a switch 32, the $I$ signal is coupled similarly to a switch 33, the $Q$ signal is coupled similarly to a switch 37, and the output signal of the amplifier 34 is coupled similarly to a switch 38. The switches are shown as field effect transistors for purposes of illustration.

The switches are controlled by the output signal of the amplifier 30 or its complement signal from the inverter 31. If the value of $I$ is greater than the value of $Q$, the switches 33 and 38 will be activated to conduct the signals representing the value of $I$ and the output signal ($Q/2$) of the amplifier 35. If the value of $Q$ is greater than the value of $I$, the switches 32 and 37 will be activated, providing at their respective outputs the values of $I/2$ and $Q$. The signals at the output side of the switches are coupled to an analog adder 36 to provide an output signal equal to the sum of the input signals.

The invention described teaches a circuit for forming a linear approximation of the square root of the sum of two squares. Modifications may be made in the circuits and system, which have been described and illustrated to explain the nature of the invention, by those skilled in the art within the principle and scope of the invention as expressed in the appended claims.

What is claimed is:
1. The combination comprising:
   source means for providing signals indicative of two values;
   comparator means responsive to the source means for providing an output signal indicative of the relative magnitudes of the two values;
   scaler means responsive to the source means and the output signal from said comparator means for producing quotient signals by dividing the lesser of said two values by two and the greater of said two values by one; and
   adder means coupled to the scaler means for producing output signals indicative of the sum of the quotient signals produced by said scaler means.
2. The invention claimed in claim 1
   wherein said two values are indicated by electrical signals representing binary numbers; and
   said scaler includes a binary bit shift means for moving each bit signal of the lesser binary number to the next lower significance position.
3. The invention as claimed in claim 2 further including retiming means for storing the source signals and the output signal from said comparator means and wherein
   said scaler means is responsive to the values in the retiming means.
4. The invention as claimed in claim 3 wherein said comparator comprises a subtractor means and the output signal represents a borrow signal from the most significant bit position.

* * * * *

Dedication 3,858,036.—*John Albert Lunsford*, Delran, N.J. SQUARE ROOT OF SUM OF SQUARES APPROXIMATOR. Patent dated Dec. 31, 1974. Dedication filed Sept. 30, 1976, by the assignee, *RCA Corporation*.
Hereby dedicates said patent to the Public.
 [*Official Gazette September 30, 1980.*]